Feb. 1, 1966    H. J. BUCHANAN ET AL    3,232,636
CONVEYANCE FOR ELONGATED BEAMS
Filed Oct. 21, 1963    2 Sheets-Sheet 1
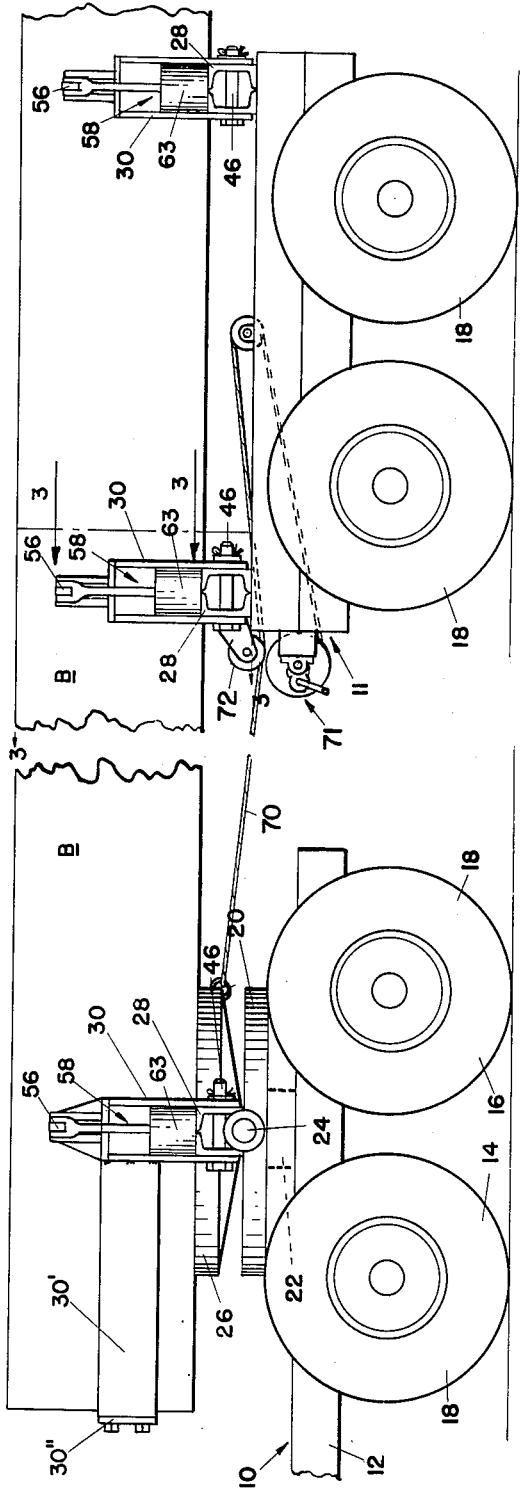
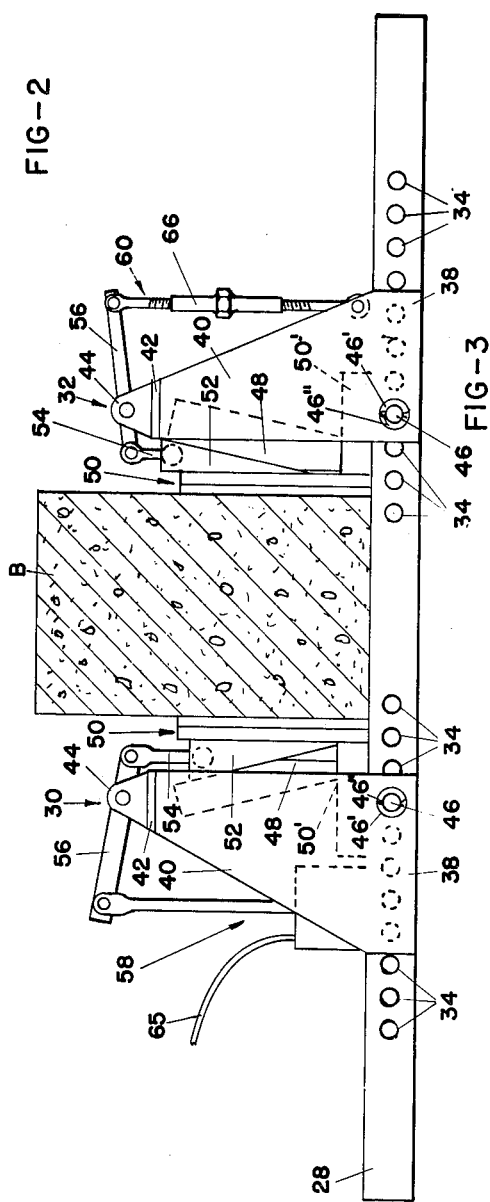
Henry J. Buchanan
Albert L. Reed
INVENTORS.
BY Norman W. Ruff Feb. 1, 1966  H. J. BUCHANAN ET AL  3,232,636
CONVEYANCE FOR ELONGATED BEAMS
Filed Oct. 21, 1963  2 Sheets-Sheet 2
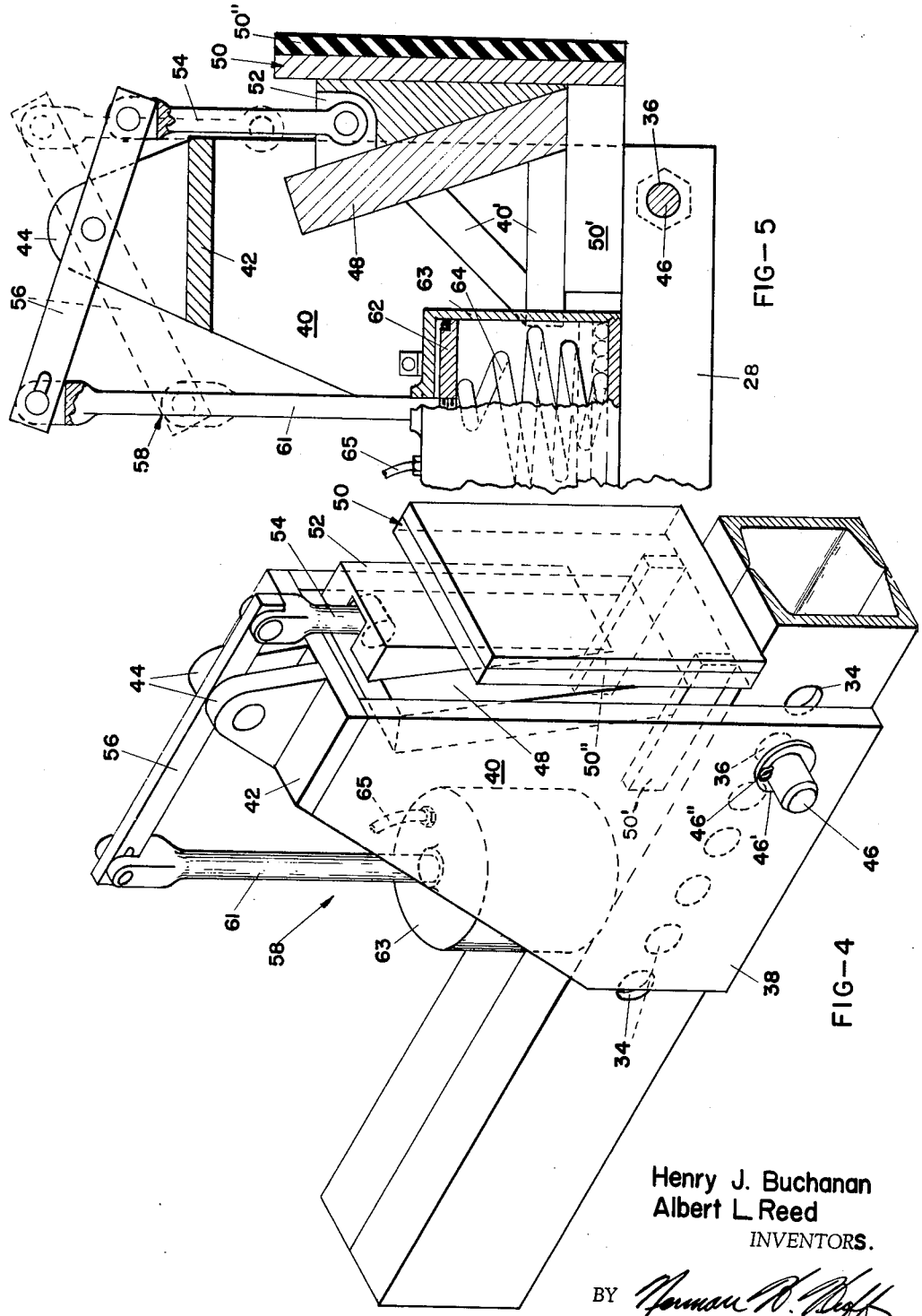
Henry J. Buchanan
Albert L. Reed
INVENTORS.

# United States Patent Office 3,232,636
Patented Feb. 1, 1966

3,232,636
CONVEYANCE FOR ELONGATED BEAMS
Henry J. Buchanan, Box 813, and Albert L. Reed,
Box 637, both of Coeur d'Alene, Idaho
Filed Oct. 21, 1963, Ser. No. 317,658
4 Claims. (Cl. 280—404)

Our present invention lies in the field of transportation and is more particularly an improved conveyance for transporting elongated beams such as pre-stressed concrete beams which are part of large construction projects, as for example, bridges.

In transporting beams of this character, frequenly the beams are from 40 to 65 feet in length, but under other circumstances beams of 70 to 80 feet in length have been transported for particular uses.

A beam of the general length of 65 to 70 feet may be approximately 40,000 pounds in weight. Because of this weight, the laws of most States require that there shall be a relatively large tire area upon the highway surface to minimize the damage to the highway over which the beam is transported. Therefore, it is customary to employ a tractor having dual rear axles and also dual wheels, thus supporting one end of the beam on eight tires. Similar requirements for support obtain for the trailer wherein a pair of axles are provided with dual wheels resulting in eight tires supporting the trailer. This results in a trailer which, upon turning, is obliged to scrape or slide at least some of the wheels laterally over the roadway if it is to maintain parallelism with the rigid pre-stressed concrete beam.

Obviously, with the weights in the range of 200,000+ pounds resting upon the trailer, considerable torque is created between the beam and the trailer when the tractor is steered in a circuitous path. It therefore requires that the beam must be rigidly secured to the trailer to maintain its parallel relationship with the beam during turning movements. If the trailer is permitted to angulate even the slightest amount with respect to the axis of the beam, it will then cause the trailer and trailing portion of the beam to move laterally from the path of the truck during straight line movement of the tractor.

It is an object of the present invention to provide a conveyance particularly designed for transporting pre-stressed concrete beams and similar items.

It is another object of the present invention to provide a conveyance for transporting items of the character described which includes a tractor and trailer adapted to receive and secure thereon a beam which constitutes a drawbar for the trailer, and having means for securing the beam, which means is adjustable to accommodate beams of various sizes.

It is yet another object of the present invention to provide a conveyance for transporting pre-stressed concrete beams which conveyance includes a tractor and trailer interconnected by the beam constituting a drawbar for the trailer wherein the tractor has a universally mounted platform and the trailer has a supporting frame each of which is provided with a number of manually adjustable clamping frames adjustable into adjacency with the beam; each frame having a clamping plate movable with respect to the frame to clamp the beam against accidental displacement with respect to the platform and the trailer frame.

These and other objects of the present invention will become apparent during the course of the following description when considered in conjunction with the accompanying drawings wherein like numerals are employed to designate like parts.

In the accompanying drawings, we have shown a preferred form of our present invention. However, it is to be understood that the drawings are exemplifying only and are not intended to restrict the scope of the present invention beyond that scope expressly stated in the appended claims.

In the drawings:

FIGURE 1 is a vertical side elevation of the rear portion of a conventional tractor;

FIGURE 2 is a similar view of a trailer;

FIGURE 3 is an enlarged vertical view taken upon a lateral plane substantially indicated by line 3—3 of FIGURE 2;

FIGURE 4 is a further enlarged isometric of one clamping frame and its adjustable association with an elongated box member; and FIGURE 5 is a vertical sectional view of the clamping frame of FIGURE 4 and having parts broken away for convenience of illustration.

Referring now more particularly to the drawings, the numeral 10 indicates in its entirety a conventional tractor which includes a source of power and the front steering wheels for control by an operator in its cab, all of which is conventional and not shown. Extending rearwardly from the aforementioned conventional construction are frame members 12 which are supported by the powered driving wheels 14 and 16 in conventional manner. Preferably, the driving wheels 14 and 16 are of dual wheel construction, thus providing eight tires 18—18 for supporting the weight which will be carried by the frame 12 of the tractor 10. Pivotally mounted upon the frame 12 is a turntable 20, the construction of which may assume any common and well known arrangement which enables a turntable 20 to rotate, but for convenience, we prefer to employ a kingpin 22 which is designed to withstand the lateral moments imposed in the conveyance of beams of the character described.

A horizontal journal 24 extends diametrically of the turntable 20 and pivotally supports a platform 26 for rocking movement about the axis of the journal 24. Preferably, the platform will be of substantially the same lateral width as the minimum width of beam the conveyance is designed to transport. The turntable 20 and tiltable platform constitute a universally mounted platform.

Extending parallel to the journals 24 and laterally from the platform 26, we provide a fabricated box 28 at each side upon which is mounted for lateral sliding movements clamping frames 30 and 32. Extending forwardly of the tractor frame 10 from the clamping frame 30, we provide a stop yoke 30′ which is adapted to extend around the forward end of the beam B to prevent any accidental forward movement of the beam in the event of a sudden deceleration of the tractor 10. Preferably, the yoke is competed by an end plate 30″ which is releasably secured to forwardly extending arms, thus accommodating beams of varying dimensions and admitting of variations in spacing of the clamping frames 30 with respect to their companion and opposite clamping frames 32 disposed on the opposite side of the beam B as shown particularly in FIGURE 3.

Each of the platform 26 and the trailer 11 is provided with one or more of the laterally extending box members 28 and these constitute ways upon which the clamping frames 30 and 32 are slidable. The boxes 28 are provided with plural parallel bores 34 which are in alignment with bores 36 (FIGURES 4 and 5) formed in the depending flanges 38 of the clamping frames 30 and 32. The pin 46 is removably disposed in the communicating apertures 36 and 38 to adjustably secure the clamping frames 30 and 32 in adjacency to the beam B and is secured as by conventional washer 46′ and cotter key 46″. The flanges 38 extend upwardly as sidewalls 40 which are interconnected at their upper ends by a horizontal plate 42 to which is secured a pair of vertically disposed spaced flanges 44.

Between the walls 40 we provide an angled backing plate 48 which is welded or otherwise secured thereto. Inwardly of the frames 30 and 32 we have provided clamping plates 50 for each clamping frame. The plates 50 have guide bars 50' which slide in guide ways formed on the walls 40 by members 40'. An actuating wedge 52 is disposed between the clamping plate 50 and the angled backing plate 48 so that vertical movement of the wedge 52 downwardly will spread the clamping plate 50 away from its respective clamping frame 30 and 32 to force the rubber clamping surface 50'' into clamping engagement with the beam B. Upward movement of the wedge 52 will obviously release the clamping pressure against the plate 50 and permit its removal from the beam B.

To actuate the wedges 52 each is pivotally connected to a connecting link 54 which in turn is pivotally connected to an end of a lever 56 which is pivotally supported between the flanges 44 to provide a fulcrum for the lever.

At its opposed end to the link 54 the lever 56 is provided with an actuating means 58 or 60. The actuating means 58 comprises a piston rod 61 which at its lower end is connected to a piston 62 contained within a cylinder 63 for reciprocal movement and is urged upwardly as seen in FIGURE 5 by a barrel shaped compression spring 64 which imparts the clamping movement to the clamping plate 50 by lowering the wedge 52 between the clamping plate 50 and the angled backing plate 48.

It is thus seen that the beam B is clamped by the clamping mechanism by means of a mechanical contrivance which is provided with an air line 65 pressure from which lowers the piston 62 to overcome the tension of the spring 64 and thereby release the clamping action by shifting the lever 56 to the broken line position of FIGURE 5. This structure has been adopted so that in the event of the loss of air pressure in the system of the conveyance the clamps will not be accidentally released from the beam B.

Clamping frames 30 and 32 are provided with alternate forms of prime movers for actuating the clamping action of its clamping plate 50. Frame 32 comprises a mechanically operated turn buckle which expands and contracts the length of the actuating means 60 and is pivotally interconnected at one end to the clamping frame 32 and at the other to the lever 56.

In operation, the clamping frames 30 and 32 are separated sufficiently to permit the crane to lower the beam B onto the platform 26 trailer frame consisting of the parallel boxes 28. By manual manipulation, pins 46 are removed and the clamping frames 30 and 32 are slid along their respective boxes 28 into adjacency to the beam B whereupon the pins 46 are replaced and secured. Thence the turn buckle 66 is operated to lower the wedge 52 and move the clamping plate 50 into contact with the beam B and if necessary, this may be used to shift teh beam B to the center of the box 28 if such distance is very small. Then the air pressure is released from the cylinder 63 whereupon the spring 64 actuates the means 58 from lowering its wedge 52 to place clamping pressure between the clamping plates 52 thus holding the beam in position.

It will be noted that we have provided a pair of companion clamping frames 30 and 32 at the fore and aft positions of the trailer 11 to insure proper and constant alignment of the beam B with the direction of movement of the trailer 11 while only one pair of companion clamping members 30 and 32 is shown on the platform 26. It will be understood that plural companion clamping members may be supplied on the trailer. In instances where the beam is a small and light-weight beam, it may be practical to use only one pair of companion clamping members 30 and 32 on the trailer.

To counteract the torque created about the front axle of the trailer when the brakes are applied, we provide a snubbing cable 70 releasably secured to the tractor and trailer at points midway their widths and tightened by means of the winch 71. The cable passes under a pulley 72 and thus prevents counter-clockwise rotation of the frame 11, as viewed in FIGURE 2, when the brakes are applied.

Having thus described our invention, we desire to secure by Letters Patent of the United States the following:

1. In a conveyance for transporting prestressed concrete beams and the like, wherein a tractor has a universally mounted platform supporting one end of a beam and a trailer has a supporting frame carrying the other end of said beam, said beam constituting a drawbar interconnecting said tractor and trailer, means releasably securing said beam to said tractor and trailer, comprising:
   each of said tractor platform and trailer frame having a number of pairs of moveable companion clamping frames;
   means for securing said frames at selected positions;
   each said frame having a clamping plate movable in the directions of its respective frame movement and with respect to its frame; and
   releasable power means carried by each said frame for shifting its respective clamping plate into clamping engagement with said beam adjacent to which said frames have been selectively fixed.

2. In a conveyance for transporting prestressed concrete beams and the like wherein a tractor has a universally mounted platform supporting one end of a beam and a trailer has a supporting frame carrying the other end of said beam, said beam constituting a drawbar interconnecting said tractor and trailer, means releasably securing said beam to said tractor and trailer, comprising:
   plural clamping means on said platform and supporting frame for selectively and immovably clamping said beam thereto;
   each said clamping means being a pair of companion clamping frames movable laterally of its respective platform or supporting frame;
   means fixing said frames to their respective platform or supporting frame adjacent to the beam carried thereon;
   a clamping plate carried by each said frame and movable with respect to its frame into clamping engagement with said beam;
   an angled backing plate rigid with said frame;
   a wedge disposed between said backing plate and said clamping plate for imparting clamping and releasing movements to said clamping plate; and
   means for selectively actuating said wedge.

3. The invention defined in claim 2 and further characterized by said last named means, comprising:
   a lever pivoted on said clamping frame;
   a connecting rod interconnecting said wedge and one end of said lever for coincident movement; and
   means for imparting movement to said lever effective to actuate said wedge to move said clamping plate for clamping movement comprising a spring with a fluid motor for rendering said spring inoperative.

4. The invention defined in claim 2 and further characterized by said last named means, comprising:
   a lever pivoted on said clamping frame;
   a connecting rod interconnecting said wedge and one end of said lever for coincident movement; and
   means for imparting movement to said lever effective to actuate said wedge to move said clamping plate for clamping movement comprising a manually operable turn buckle connected to actuate said lever.

(References on following page)

References Cited by the Examiner

UNITED STATES PATENTS

| | | | |
|---|---|---|---|
| 1,996,695 | 4/1935 | Bigley | 280—144 |
| 2,053,638 | 9/1936 | Schroeder | 105—369 |
| 2,331,416 | 10/1943 | Muller. | |
| 2,388,304 | 11/1945 | Ackerman | 280—144 X |
| 2,733,935 | 2/1956 | Whiteley. | |
| 3,087,744 | 4/1963 | Tanenbaum | 280—404 |
| 3,123,380 | 3/1964 | Grim et al. | 280—404 |

LEO FRIAGLIA, *Primary Examiner.*